United States Patent [19]

Raab et al.

[11] Patent Number: 4,577,743

[45] Date of Patent: Mar. 25, 1986

[54] CLUTCH DISC FOR A MOTOR VEHICLE FRICTION CLUTCH

[75] Inventors: Harald Raab, Schweinfurt; Hilmar Göbel, Grafenrheinfeld, both of Fed. Rep. of Germany

[73] Assignee: Fichtel & Sachs AG, Schweinfurt, Fed. Rep. of Germany

[21] Appl. No.: 639,353

[22] Filed: Aug. 9, 1984

[30] Foreign Application Priority Data

Aug. 23, 1983 [DE] Fed. Rep. of Germany ....... 3330343

[51] Int. Cl.⁴ ............................................... F16D 3/14
[52] U.S. Cl. ................................................. 192/106.2
[58] Field of Search ............... 192/106.2, 106.1, 70.18, 192/70.17, 70.16; 464/68

[56] References Cited

U.S. PATENT DOCUMENTS

| | | | |
|---|---|---|---|
| 2,276,416 | 3/1942 | Nutt | 192/106.2 |
| 3,995,726 | 12/1976 | De Gennes | 192/106.2 |
| 4,406,357 | 9/1983 | Nagano et al. | 192/106.2 |

FOREIGN PATENT DOCUMENTS 7538331  5/1976  Fed. Rep. of Germany .
3121376 12/1982  Fed. Rep. of Germany .

Primary Examiner—George H. Krizmanich
Attorney, Agent, or Firm—Toren, McGeady, Stanger, Goldberg & Kiel

[57] ABSTRACT

The clutch disc for a motor vehicle friction clutch comprises a hub with side discs arranged axially on both sides of its hub flange and connected with friction linings into one unit. The side discs are rotatable in relation to the hub disc by the stressing of springs. An underload friction damper comprises two control discs arranged axially on both sides of the hub disc, one of which comprises axial tabs which pass through openings of the hub disc. The other control disc is guided non-rotatably but axially displaceably on the tabs. Friction rings are arranged axially between the side discs on the one part and the control discs on the other. The friction force is generated by a dished spring which is clamped axially resiliently in between the axial tabs of the one control disc and the axially movable other control disc utilized as pressure disc. An idling friction damper is accommodated between the side discs protected radially within the zone radially defined by the tabs.

6 Claims, 7 Drawing Figures

CLUTCH DISC FOR A MOTOR VEHICLE FRICTION CLUTCH

BACKGROUND OF THE INVENTION

The invention relates to a clutch disc for a motor vehicle friction clutch.

A clutch disc for a friction clutch of a motor vehicle is known from Fed. German Publ. Spec. No. 31 21 376. The clutch disc comprises a hub from which a hub disc protrudes radially. Axially on both sides of the hub disc, side discs connected fixedly with one another into a unit are mounted for rotation through a limited angle on the hub. One of the side discs carries the friction linings of the clutch disc. Several damping springs are arranged in windows of the hub disc and the side discs and are subjected to compression stress on relative rotation of the hub disc and the side discs. The clutch disc comprises an under-load friction damper dimensioned for under-load operation of the internal combustion engine of the motor vehicle and an idling friction damper dimensioned for idling operation. The under-load friction damper has a single control disc arranged axially between the hub disc and one of the side discs and co-operating in the usual way with one of the damping springs such that it accompanies the relative rotation of hub disc and side disc only after overcoming a certain idling rotation angle. The control disc forms one of the friction faces of the under-load friction damper and is initially stressed by a dished spring through a friction ring against the adjacent side disc. The dished spring is supported on the one hand on the other side disc and on the other hand on tabs of the control disc which engage axially through openings of the hub disc. The idling friction damper is arranged together with the dished spring of the under-load friction damper radially within the region of the clutch disc which is radially enclosed by the tabs.

In the known clutch disc the dished spring of the under-load friction damper is supported directly on the side disc. This increases the wear both of the side disc and of the dished spring. Furthermore the tabs passing through the hub disc are irregularly stressed in the circumferential direction of the control disc. The control disc and its tabs must therefore be comparatively stoutly dimensioned.

From German Utility Model No. 75 38 331 a further clutch disc is known in which between side discs, arranged axially on both sides of the hub disc and connected with clutch friction linings, on the one hand and the hub disc one the other, there are arranged two control discs which co-operate each with different damping springs and are connected with one another to form a unit by rivets passing through openings of the hub disc. The idling friction damper of this clutch disc is seated axially outside the side discs. The clutch disc of this construction type has relatively large dimensions in the axial direction.

OBJECT OF THE INVENTION

It is an object of the invention to provide a clutch disc which is comparatively narrow in the axial direction, in which the under-load friction damper is subject to only comparatively slight wear and in which the spring forces of the under-load friction damper do not influence the idling friction damper. Moreover, the idling friction damper is to be accommodated in protected manner between the two side plates of the clutch disc.

SUMMARY OF THE INVENTION

The clutch disc according to the invention for a motor vehicle friction clutch has an under-load friction damper having two control discs arranged on axially mutually opposite sides of the hub disc. One of these two control discs is seated non-rotatably but axially displaceably on tabs which protrude axially from the external circumference of the other control disc and engage through openings of the hub disc. The spring of annular disc form, formed especially as dished spring, of the under-load friction damper is stressed in between the tabs and this axially displaceable control disc. In this way said one control disc serves as pressure disc for a friction ring arranged between said one control disc and the adjacent side disc. Due to the doubling of the number of controls discs, the forces to be transmitted by the control discs are also halved and made symmetrical. The idling friction damper is arranged radially within the region of the under-load friction damper radially defined by the tabs. The dished spring of the under-load friction damper is on the other hand provided radially outside this region and is guided exactly by the tabs. This produces a functionally reliable and space-saving arrangement of the two friction dampers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
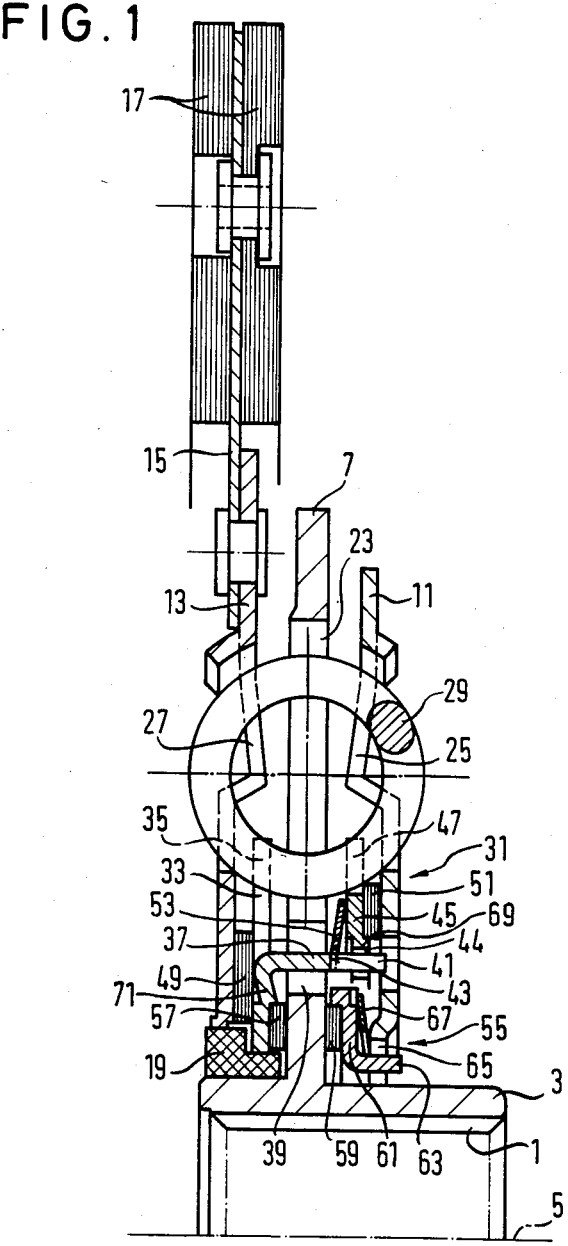
FIG. 1 shows an axial longitudinal section through the upper half of a clutch disc for a motor vehicle friction clutch.
Figure 2:
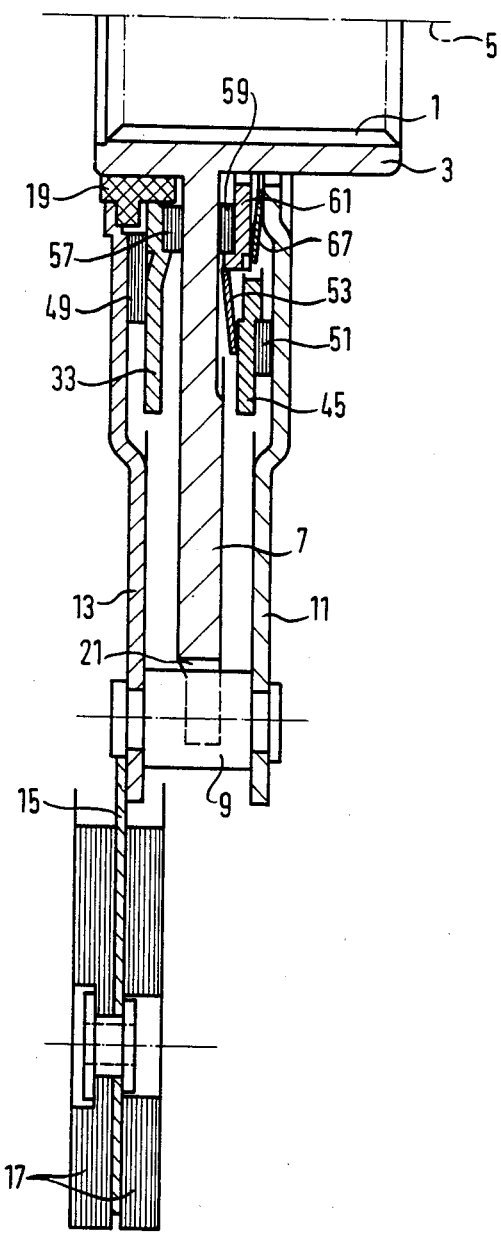
FIG. 2 shows an axial longitudinal section through the lower half of the clutch disc.
Figure 3:
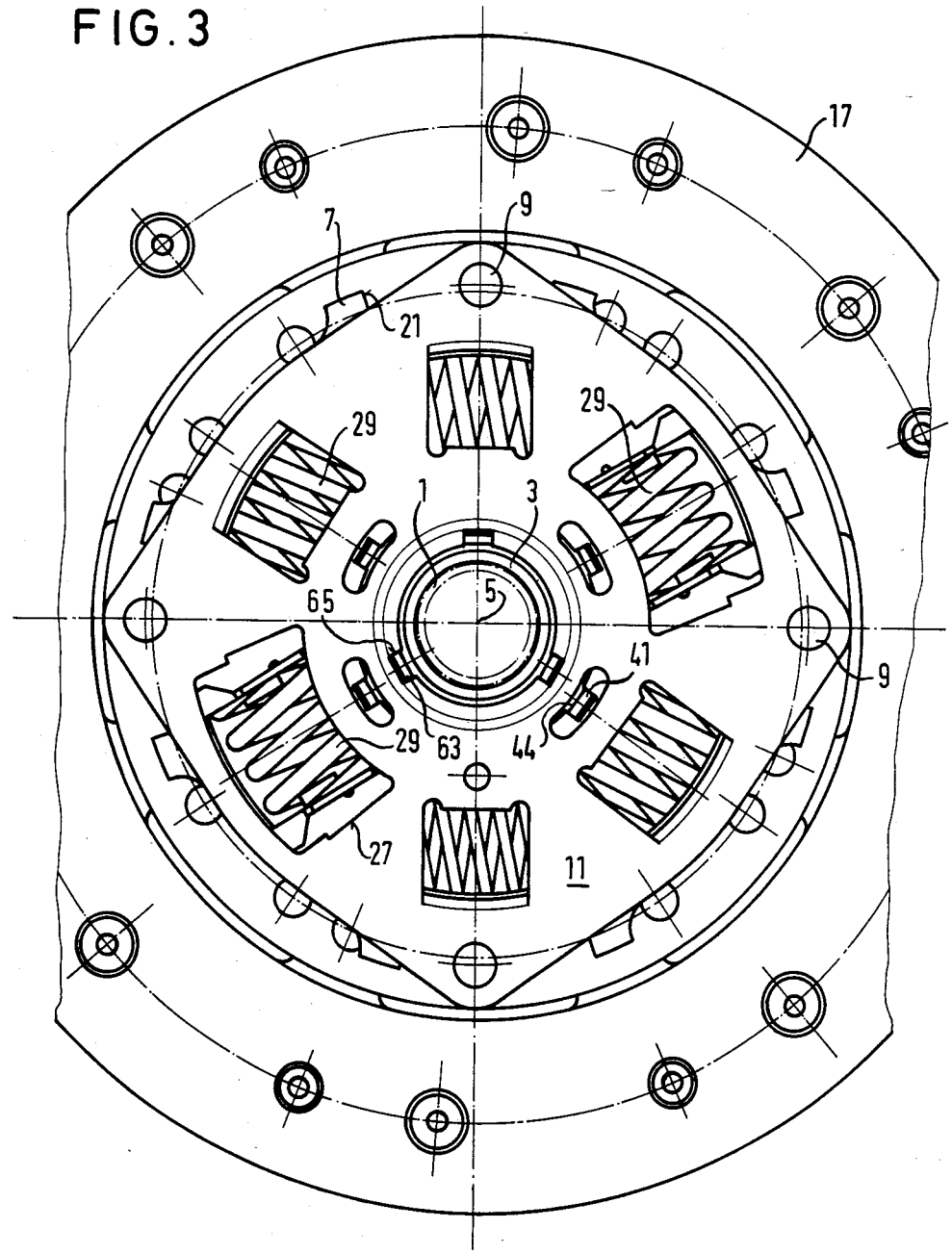
FIG. 3 shows a plan view of the clutch disc.

The clutch disc as represented in FIGS. 1 to 3 has a hub 3 provided in the usual manner with an internal toothing 1 and seated non-rotatably but axially displaceably on a transmission input shaft (not shown) of the motor vehicle, which shaft rotates about a rotation axis 5. From the hub 3 a hub disc 7 protrudes radially. Axially on both sides of the hub disc 7 there are arranged cover plates or side discs 11, 13 connected with one another by means of spacing rivets 9 to form one unit. The side disc 13 carries a lining carrier disc 15 with clutch friction linings 17. The unit formed by the side discs 11, 13 is mounted at the internal circumference of the side disc 13 rotatably on the hub 3 by means of a bearing race ring 19 of slip-favoring material. The relative rotation angle is defined by the distance rivets 9 which engage in circumferential recesses 21 of the hub disc 7.

In windows 23 of the hub disc 7 on the one part and windows 25, 27 of the side discs 11, 13 on the other there are seated helical compression springs 29 which on relative rotation of the side discs 11, 13 and the hub disc 7 are subjected to compression stress between stops facing in the circumferential direction of the windows 23, 25 and 27. As FIG. 3 shows, several such springs 29 are provided in the circumferential direction. The springs can have different spring properties and can come into action simultaneously or alternately in the damping of rotational vibrations, due to suitable dimensioning of the windows.

Figure 5:
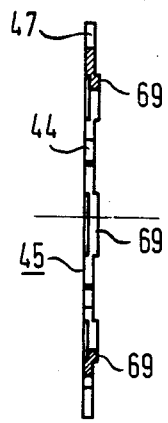
FIG. 5 shows a sectional view of the control disc seen along a line V—V in FIG. 4.
Figure 6:
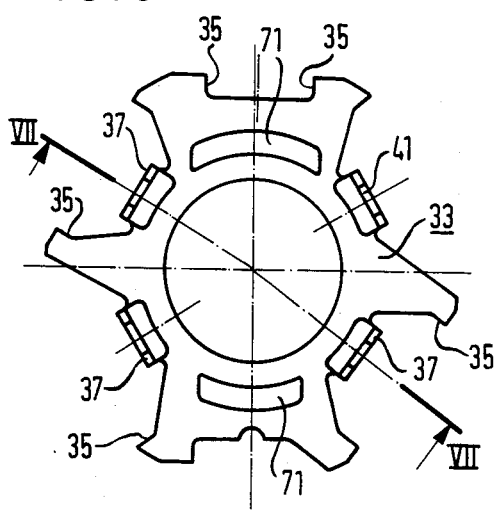
FIG. 6 shows a plan view of a further control disc of the clutch disc.
Figure 7:
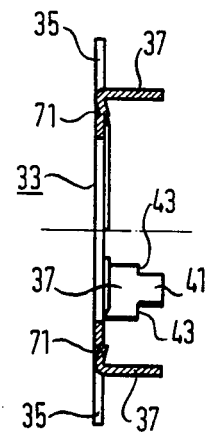
FIGURE 7 shows a sectional view of the further control disc seen along the line VII—VII in FIG. 6.

The clutch disc comprises an under-load friction damper 31, dimensioned for operation of the motor vehicle internal combustion engine under load, having a control disc 33 represented in detail in FIGS. 6 and 7. The control disc 33 has a substantially annular disc form and is arranged axially between the hub disc 7 and the side disc 13. It is mounted rotatably with its internal circumference on the race ring 19 and has on its external circumference control faces 35 pointing in the circumferential direction which abut in the usual way in operation of the clutch disc upon the end faces of the damping springs 29. The position of the control faces 35 in relation to the damping springs 29 determines the actuation characteristic of the under-load friction damper 31. The control disc 33 carries several tabs 37, offest in relation to one another in the circumferential direction, which pass axially through openings 39 of the hub disc 7 and narrow at their free ends into noses 41 on the side adjacent to the side disc 11. At the transition of the tabs 37 to the noses 41, shoulders 43 directed towards the side disc 11 are provided in the circumferential direction on both sides of the noses 41. Axially between the hub flange 7 and the side disc 11 a second control disc 45, represented in detail in FIGS. 4 and 5, encloses the region of the noses 43 and is guided non-rotatably but axially displaceably on the noses 43 with apertures 44 of its internal circumference. On its outer circumference the control disc 45 carries control faces 47 which are in conformity as regards their number and relative angle position with the control faces 35 of the control disc 33. In this way the object is achieved that the control unit of the under-load friction damper 31, formed from the control discs 33, 45 acts symmetrically on the damping springs 29 and each of the control discs needs to transmit only half of the friction forces of the under-load friction damper 31.

The under-load friction damper 31 comprises a first friction ring 49 axially between the side disc 13 and the control disc 33 and a second friction ring 51 axially between the side disc 11 and the control disc 45. Axially between the hub disc 7 and the control disc 45 a dished spring 53 is provided which radially outwardly encloses the region radially defined by the tabs 37 and axially resiliently supports itself with its internal circumference on the shoulder 43 of the tabs 37 for the one part and with its external circumference on the control disc 45 for the other part.

An idling friction damper 55 is arranged radially within the region radially defined by the tabs 37. The idling friction damper 55 comprises two friction rings 57, 59 arranged axially on both sides of the hub disc 7. The friction ring 57 co-operates with the hub disc 7 and the control disc 33. The friction ring 59 is seated under stress between the hub disc 7 and an annular pressure disc 61, from the internal circumference of which tabs 63 are bent off axially towards the side disc 11. The tabs 63 engage in openings 65 on the internal circumference of the side disc 11 and guide the pressure ring 61 nonrotatably but axially displaceably on the side disc 11. An axially resilient dished spring 67 which generates the initial stress force of the idling friction damper is under stress axially between the pressure ring 61 and the side disc 11.

Figure 4:
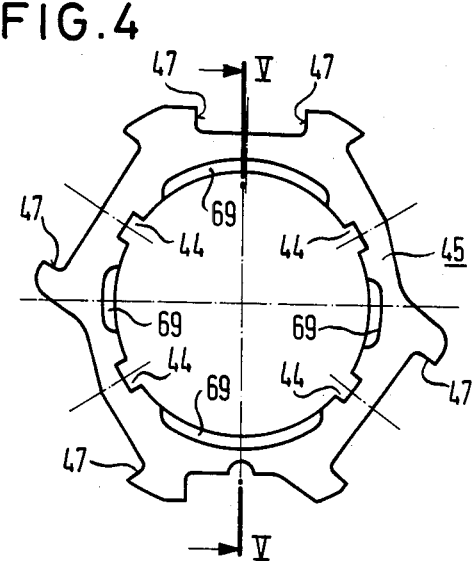
FIG. 4 shows a plan view of a control disc of the clutch disc.

As FIGS. 4 and 5 show, protruding pieces 69 are formed by swaging on the control disc 45 and guide the friction ring 51 radially. In the same manner, protruding parts 71 for the radial guidance of the friction ring 57 are formed by swaging on the control disc 33 as well. The friction ring 59 can be guided radially in a similar manner on the pressure ring 61.

While specific embodiments of the invention have been shown and described in detail to illustrate the application of the inventive principles, it will be understood that the invention may be embodied otherwise without departing from such principles.

We claim:
1. In a clutch disc for a motor vehicle friction clutch comprising:
 (a) a hub which defines a rotation axis of the clutch disc and carries a radially protruding hub disc,
 (b) two side discs arranged on axially opposite sides of the hub disc and being firmly connected with one another and mounted rotatably as a unit through a limited angle of rotation on the hub in relation to the hub disc about the rotation axis,
 (c) clutch friction linings fixedly connected with one of the side discs,
 (d) a plurality of damping springs retained in windows of the hub disc and the side discs and stressable on relative rotation of the hub disc and the side discs,
 (e) an under-load friction damper device dimensioned for operation under load,
 with two annular control discs rotatable through a limited angle of rotation in relation to the hub disc and the side discs and co-operating with at least one of the damping springs, a first one of the two control discs being arranged axially between the hub disc and a first one of the two side discs, said first control disc being provided with several tabs staggered in the circumferential direction and passing axially through openings of the hub disc and a second one of the two control discs being arranged axially between the hub disc and a second one of the two side discs, said second control disc being arranged substantially radially outside the diameter defined by the tabs and being guided non-rotatably but axially displaceably on the tabs of the first control disc,
 with a first friction ring arranged axially between the first control disc and the first side disc,
 with a second friction ring clamped axially in between the second control disc and the second side disc and with an axially acting first spring of annular disc form which is arranged axially between the hub disc and the second of the two side discs and is stressed in the axial direction between the tabs of the first control disc and the second side disc, said first spring being arranged axially between the hub disc and the second control disc and supported with its internal circumference on the tabs and with its external circumference on the second control disc, and (f) an idling friction damper device dimensioned for idling operation with a third friction ring arranged axially between one of the two side discs and the hub disc and an axially acting second spring stressed in axially between the other of the two side discs and the hub disc, in each case radially within the diameter radially defined by the tabs of the first control disc.

2. Clutch disc according to claim 1, wherein each tab has shoulders facing axially towards the second side disc at its end, which merge into axially protruding noses, wherein the first spring is supported on the shoulders and wherein the second control disc is guided non-rotatably but axially displaceably on the noses.

3. Clutch disc according to claim 1, wherein the second spring is formed as a spring of annular disc form, and wherein axially between the second spring and the hub disc a pressure ring guided non-rotatably but axially displaceably on the side disc axially adjacent to it is arranged and axially between the pressure ring and the hub disc a further friction ring of the idling friction damper device is arranged.

4. Clutch disc according to claim 3, wherein the first spring and the second spring are arranged on the same axial side of the hub disc.

5. Clutch disc according to claim 1, wherein the first control disc comprises protuberances swaged out axially towards the third friction ring, said protuberances guiding the third friction ring radially.

6. Clutch disc according to claim 1 or 2, wherein the second control disc comprises protuberances swaged out axially towards the second friction ring, said protuberances guiding the second friction ring radially.

* * * * *